United States Patent
Zhang et al.

(10) Patent No.: US 12,406,400 B2
(45) Date of Patent: Sep. 2, 2025

(54) METHOD AND APPARATUS FOR PREDICTIVELY CODING AND DECODING ATTRIBUTE INFORMATION OF POINT CLOUD

(71) Applicant: Honor Device Co., Ltd., Shenzhen (CN)

(72) Inventors: Wei Zhang, Shenzhen (CN); Fuzheng Yang, Shenzhen (CN); Zexing Sun, Shenzhen (CN); Junyan Huo, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 0 days.

(21) Appl. No.: 18/265,874

(22) PCT Filed: May 18, 2022

(86) PCT No.: PCT/CN2022/093617
§ 371 (c)(1),
(2) Date: Jun. 7, 2023

(87) PCT Pub. No.: WO2022/247705
PCT Pub. Date: Dec. 1, 2022

(65) Prior Publication Data
US 2024/0037796 A1    Feb. 1, 2024

(30) Foreign Application Priority Data
May 26, 2021  (CN) .......................... 202110580205.1

(51) Int. Cl.
*G06T 9/00* (2006.01)

(52) U.S. Cl.
CPC ...................................... *G06T 9/00* (2013.01)

(58) Field of Classification Search
None
See application file for complete search history.

(56) References Cited

U.S. PATENT DOCUMENTS

| | | |
|---|---|---|
| 10,904,564 B2 | 1/2021 | Yea et al. |
| 2020/0105025 A1 | 4/2020 | Yea et al. |
| 2020/0366932 A1 | 11/2020 | Li et al. |
| 2022/0130074 A1 | 4/2022 | Zheng et al. |

(Continued)

FOREIGN PATENT DOCUMENTS

| | | |
|---|---|---|
| CN | 109257604 A | 1/2019 |
| CN | 110708560 A | 1/2020 |
| CN | 111405281 A | 7/2020 |

(Continued)

OTHER PUBLICATIONS

Machine translation of WO2021049758, Kim et al. (Year: 2021).*

(Continued)

*Primary Examiner* — Peter Hoang
(74) *Attorney, Agent, or Firm* — Slater Matsil, LLP

(57) ABSTRACT

A method for coding includes: obtaining original point cloud data; creating an adaptive prediction list of the attribute information of the point cloud; selecting a prediction mode from the adaptive prediction list and predicting the attribute information of the point cloud, to obtain a predicted residual; and coding the prediction mode and the predicted residual, to obtain codestream information.

19 Claims, 3 Drawing Sheets

(56) References Cited

U.S. PATENT DOCUMENTS

2022/0343548 A1    10/2022    Park et al.

FOREIGN PATENT DOCUMENTS

| CN | 112385222 A | 2/2021 |
| CN | 112385238 A | 2/2021 |
| CN | 112449754 A | 3/2021 |
| CN | 112565734 A | 3/2021 |
| CN | 112565757 A | 3/2021 |
| WO | 2021045603 A1 | 3/2021 |
| WO | 2021049758 A1 | 3/2021 |
| WO | 20210456031 A1 | 3/2021 |

OTHER PUBLICATIONS

Hyun-Mook Oh et al: "[G-PCC] [new proposal] Coordinate conversion for attribute coding of cat3-frame data", 130. MPEG Meeting, Apr. 2020, Alpbach, At; (Motion Picture Expert Group or ISO/IEC JTC1/SC29/WG11), No. m53613, total 4 pages.

* cited by examiner

METHOD AND APPARATUS FOR PREDICTIVELY CODING AND DECODING ATTRIBUTE INFORMATION OF POINT CLOUD

CROSS-REFERENCE TO RELATED APPLICATIONS

This application is a national stage of International Application No. PCT/CN2022/093617, filed on May 18, 2022, which claims priority to Chinese Patent Application No. 202110580205.1, filed-on May 26, 2021 and entitled both of which is are incorporated herein by references in their entireties.

TECHNICAL FIELD

The present invention pertains to the field of coding and decoding technologies for a point cloud, and in particular, to a method and an apparatus for predictively coding and decoding attribute information of a point cloud.

BACKGROUND

With the improvement of a capability of hardware processing and the rapid development of computer vision, 3D point cloud data has been widely applied to virtual reality, augmented reality, autonomous driving, environment modeling, and the like. However, a large-scale point cloud usually has a large amount of data, which is extremely not conducive to transmission and storage of point cloud data. Therefore, the large-scale point cloud needs to be coded and decoded efficiently.

In an existing technology for coding and decoding a point cloud, attribute information of the point cloud is usually coded based on recreated geometric information. Specifically, in a method for geometry-based point cloud compression (G-PCC) provided in a prior art 1, a method for predictively coding attribute information based on a Morton code of the point cloud for neighboring search is mainly used. First, a corresponding Morton code is obtained through calculation based on geometric coordinates of the point cloud. Second, a neighbor is searched for based on the Morton code of a point, and a prediction list is filled with an attribute information value of the neighbor and a weighted average value of the attribute information value. Then, mode selection is performed based on a rule, and an optimal prediction mode is selected, to predict attribute information of a point to be coded currently. Finally, the selected prediction mode and an obtained predicted residual are coded. In a method for coding and decoding a point cloud based on 2D regularized planar projection provided in a prior art 2, two frameworks are proposed for coding and decoding the attribute information of the point cloud: a framework for simultaneously coding and decoding geometric information and the attribute information of the point cloud, and a framework for coding and decoding the attribute information based on geometric reconstruction.

However, because the attribute information of the point cloud is closely related to a scenario. In an existing method, attribute information of a neighboring point is used in geometric space to perform prediction, without considering discontinuity of an actual scenario and a correlation between another piece of information and the attribute information. Consequently, an obtained predicted residual of the attribute information is large, prediction accuracy is low, and multiple outliers and hop values exist, which affects coding efficiency.

SUMMARY

To resolve the foregoing problems in the prior art, the present invention provides a method and an apparatus for predictively coding and decoding attribute information of a point cloud. The technical problems are resolved in the present invention in the following technical solutions.

A method for predictively coding attribute information of a point cloud is provided. The method includes:
  obtaining original point cloud data;
  creating an adaptive prediction list of the attribute information of the point cloud;
  selecting a prediction mode from the adaptive prediction list and predicting the attribute information of the point cloud, to obtain a predicted residual; and
  coding the prediction mode and the predicted residual, to obtain codestream information.

In an embodiment of the present invention, the creating an adaptive prediction list of the attribute information of the point cloud includes:
  creating and initializing a prediction list; and
  selecting several points from a coded point based on a rule, and updating the prediction list based on attribute information of the selected points, to obtain an adaptive prediction list of attribute information of a point to be coded currently.

In an embodiment of the present invention, the selecting several points from a coded point based on a rule, and updating the prediction list based on attribute information of the selected points includes:
  inserting attribute information of a previously coded point of the point to be coded currently into a first position of the prediction list;
  selecting several points from coded points collected by a laser to which the point to be coded currently belongs, and inserting the attribute information of the selected points into the prediction list; and when it is determined that the prediction list is not filled, successively selecting several points from coded points collected by other lasers and inserting the attribute information of the selected points into the prediction list.

In an embodiment of the present invention, selecting several points from coded points collected by a laser to which the point to be coded currently belongs or another laser, and inserting the attribute information of the selected points into the prediction list includes:
  determining a search range in the coded points collected by the laser;
  selecting m points in the search range based on first information of the points;
  if it is determined that a point with same first information exists among the m points, screening the m points based on second information of the point, and inserting attribute information of a selected point into the prediction list; and if it is determined that no point with same first information exists among the m points, inserting attribute information of the m points into the prediction list.

In an embodiment of the present invention, the screening the m points based on second information of the point, and inserting attribute information of the selected point into the prediction list includes:

finding n points with the same first information among the m points;

inserting attribute information of m-n points with different first information in the m points into the prediction list;

selecting, from the n points, previous t points with second information and nearest to the point to be coded currently; and if it is determined that a point with same second information exists among the t points, screening the t points based on third information of the point, and inserting attribute information of a selected point into the prediction list; and if it is determined that no point with same second information exists among the t points, inserting attribute information of the t points into the prediction list.

In an embodiment of the present invention, the screening the t points based on third information of the points, and inserting attribute information of a selected point into the prediction list includes:

finding all k points with the same second information among the t points;

inserting attribute information of t-k points with different second information in the t points into the prediction list; and selecting, from the k points, a point with third information and nearest to the point to be coded currently, and inserting attribute information of the point into the prediction list.

In an embodiment of the present invention, the first information is depth information of a point or a spatial position of the point;

the second information is the depth information or spatial position of the point, where when the first information is the depth information, the second information is the spatial position; and when the first information is the spatial position, the second information is the depth information; and the third information is azimuth information of the point.

In an embodiment of the present invention, the coding the prediction mode and the predicted residual, to obtain codestream information includes:

designing a context model for the prediction mode based on the adaptive prediction list;

coding the prediction mode by using the context model; and coding the predicted residual, to obtain the codestream information.

Another embodiment of the present invention provides an apparatus for predictively coding attribute information of a point cloud. The method includes:

a first data obtaining module, configured to obtain original point cloud data;

a first calculating module, configured to create an adaptive prediction list of the attribute information of the point cloud;

a first predicting module, configured to select a prediction mode from the adaptive prediction list and predict the attribute information of the point cloud, to obtain the predicted residual; and a coding module, configured to code the prediction mode and predicted residual, to obtain codestream information.

Another embodiment of the present invention further provides a method for predictively decoding attribute information of a point cloud. The method includes:

obtaining codestream information;

creating an adaptive prediction list of the attribute information of the point cloud;

predicting, based on the adaptive prediction list and a prediction mode obtained through decoding, the attribute information of the point cloud, to obtain a predicted value; and recreating the attribute information of the point cloud by using the predicted value and a predicted residual obtained by decoding.

Another embodiment of the present invention further provides an apparatus for predictively decoding attribute information of a point cloud. The method includes:

a second data obtaining module, configured to obtain codestream information;

a second calculating module, configured to create an adaptive prediction list of the attribute information of the point cloud;

a second predicting module, configured to predict, based on the adaptive prediction list and a prediction mode obtained through decoding, the attribute information of the point cloud, to obtain a predicted value; and a recreating module, configured to recreate the attribute information of the point cloud by using the predicted value and a predicted residual obtained by decoding.

Beneficial effects of the present invention are as follows.

1. According to the present invention, an adaptively updated prediction list of the attribute information of the point cloud is created, and an optimal prediction mode is selected from the list to predict the attribute information of the point cloud. Therefore, a problem of discontinuity of the attribute information of the point cloud caused by discontinuity of an actual scenario is resolved. Accordingly, the predicted residual and a frequency of occurrence of an outlier and a hop, of the attribute information are significantly reduced, and prediction accuracy and coding efficiency of the attribute information are improved.

2. According to the present invention, when the attribute information of the point cloud is coded, the entropy coding context is designed for the prediction mode based on the recreated prediction list. Therefore, effectiveness of an entropy coding context model is improved, and coding efficiency is further improved.

The present invention is further described below in detail with reference to the accompanying drawings and embodiments.

DETAILED DESCRIPTION OF ILLUSTRATIVE EMBODIMENTS

The present invention is further described in detail with reference to the following specific embodiments, but implementations of the present invention are not limited to thereto.

Embodiment 1

Figure 1:
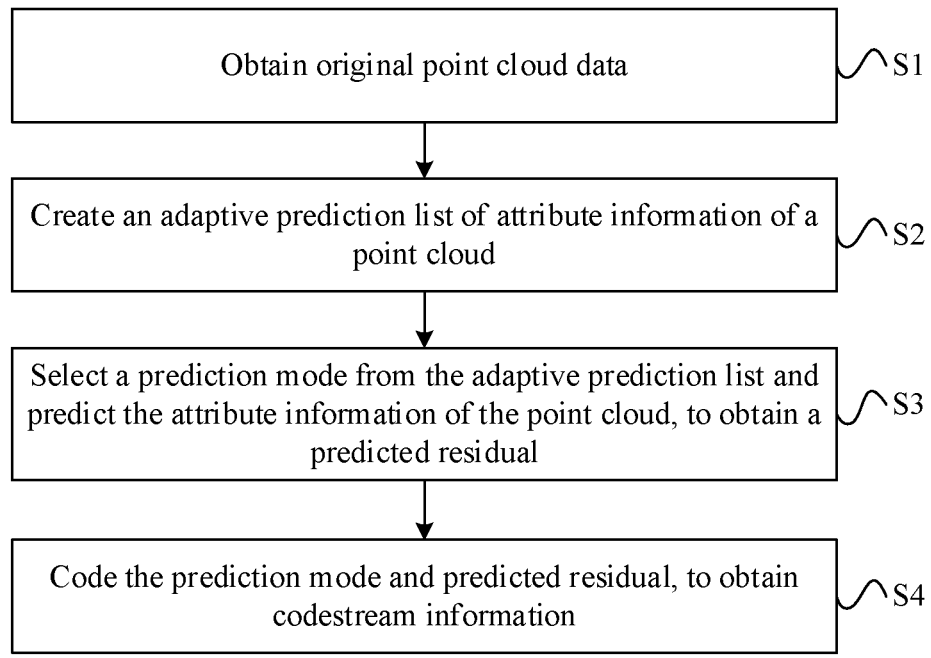
FIG. 1 is a schematic flowchart of a method for predictively coding attribute information of a point cloud according to an embodiment of the present invention.

FIG. 1 is a schematic flowchart of a method for predictively coding attribute information of a point cloud according to an embodiment of the present invention. The method specifically includes the following steps.

Step 1: Obtain original point cloud data.

Specifically, the original point cloud data usually includes a group of 3D spatial points. Each spatial point records geometric position information of each spatial point, as well as additional attribute information such as a color, reflectivity, and a normal. The original point cloud data may be obtained through scanning by a laser radar, the laser radar includes multiple laser (laser scanner) combinations arranged and distributed along both sides of a central axis, and each laser has a fixed pitch angle and may be considered as a relatively independent collection system. In addition, the original point cloud data may also be obtained through a public data set provided by various platforms.

In this embodiment, it is assumed that geometric position information of the obtained original point cloud data is expressed based on a Cartesian coordinate system. The attribute information of the original point cloud data includes but is not limited to reflectivity information.

Step 2: Create an adaptive prediction list of the attribute information of the point cloud.

It can be known, by analysis of spatial distribution of the point cloud and a principle of collection by the laser radar, that attribute information of points that are close to each other in space is similar. However, because of discontinuity of a scenario, attribute information of non-neighboring points in the space may also be similar to some extent. In addition, a relationship exists between a measurement distance and reflectivity of a collection point for the laser radar. Accordingly, a correlation also exists between depth information and the attribute information of the point cloud. Therefore, attribute information, in the point cloud, of a coded point before a point to be coded needs to be saved into a created prediction list based on a rule. Consequently, an optimal prediction mode may be selected from the prediction list based on a rule to predict attribute information of a point to be coded currently.

First, the prediction list is created and initialized.

Specifically, before attribute information of a first point in the point cloud is coded, a prediction list with a size is created and initially filled. For example, a prediction list predList with a size of 4 may be created, and some priori values of the attribute information may be filled in the prediction list, for predictively coding the attribute information of the first point.

Then, several points are selected from the coded point based on a rule, and the prediction list is updated based on attribute information of the selected points. Consequently, an adaptive prediction list of the attribute information of the point to be coded currently is obtained, for predictively coding the attribute information of the point to be coded currently. A specific process is as follows.

(a) Attribute information of a previously coded point of the point to be coded currently is inserted into a first position of the prediction list.

(b) Several points are selected from coded points collected by a laser to which the point to be coded currently belongs, and the attribute information of the selected points is inserted into the prediction list.

In this embodiment, step (b) specifically includes the following.

(b1) a search range is determined in the coded points collected by the laser.

In this embodiment, the search range is a range before the point to be coded currently. A size of the search range may be set based on an actual situation.

(b2) m points are selected in the search range based on first information of the point.

In this embodiment, a nearest neighboring method is mainly used to select a point, namely, previous m points with the first information and nearest to the point to be coded currently are selected within the determined search range.

Specifically, the first information may be depth information or a spatial position of the point. The depth information of the point is a distance from the point to the laser radar, and the spatial position is 3D spatial coordinates of the point.

(b3) If it is determined that a point with same first information exists among the m points, the m points are screened based on second information of the point, and attribute information of the selected point is inserted into the prediction list. If it is determined that no point with same first information exists among the m points, attribute information of the m points is inserted into the prediction list.

Because geometrically neighboring points in the space have strong similarity, a point with same first information among the selected m points may exist. When this happens, the m points need to be further selected. Selection is specifically as follows:
  i. all n points with the same first information are found among the m points;
  ii. attribute information of m-n points with different first information in the m points is inserted into the prediction list;
  iii. previous t points with the second information and nearest to the point to be coded currently are selected from the n points; and
  iv. if it is determined that a point with same second information exists among the t points, the t points are screened based on third information of the points, and attribute information of a selected point is inserted into the prediction list; and If it is determined that no point with same first information exists among the t points, attribute information of the t points is inserted into the prediction list.

The second information may be depth information or a spatial position of a point. In addition, when the first information is the depth information, the second information is the spatial position; and when the first information is the spatial position, the second information is the depth information.

Similarly, among the selected t points, a point with same second information still exists, and screening needs to be performed again. Details are as follows:
  i. k points with the same second information is found among the t points;

ii. attribute information of t-k points with different second information in the t points is inserted into the prediction list; and iii. a point with the third information and nearest to the point to be coded currently is selected from the k points, and attribute information of the point is inserted into the prediction list.

The third information may be azimuth information of a point. The azimuth information may be a horizontal azimuth or another piece of information related to the azimuth, such as a point with an ordinal numeral scanned by the laser.

For example, a size of the prediction list size is 4, and the first information, the second information, and the third information are the depth information, spatial position, and azimuth information respectively, and step (a) and step (b) in this embodiment are described in detail below.

Figure 2:
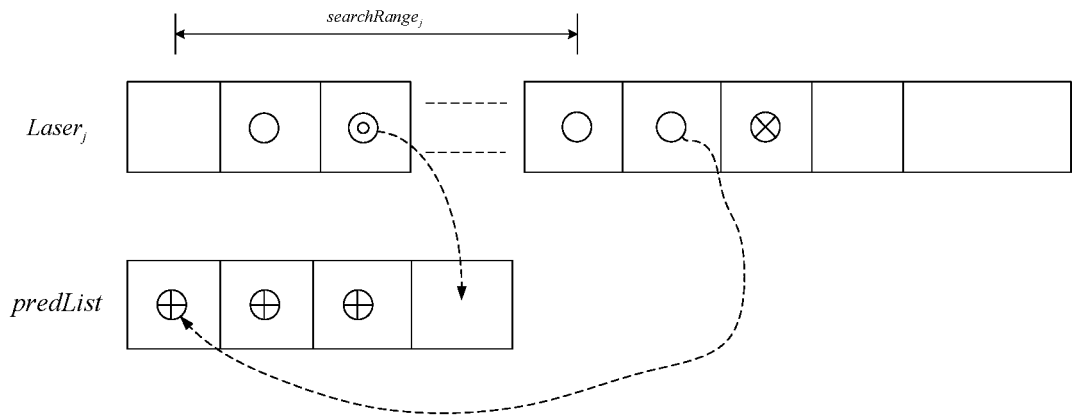
FIG. 2 is a schematic diagram of updating a prediction list by using a coded point collected by a laser to which a point to be coded currently belongs, according to an embodiment of the present invention.

Specifically, FIG. 2 is a schematic diagram of updating a prediction list by using a coded point collected by a laser to which a point to be coded currently belongs, according to an embodiment of the present invention. In FIG. 2, ⊗ is attribute information of a point to be coded, ○ is attribute information of a coded point, ⊙ is attribute information to be inserted into the prediction list, and ⊕ is attribute information of a point existing in the prediction list.

First, attribute information of a previously coded point of the point to be coded currently is inserted into a first position of the prediction list. Next, a search range is determined in a coded point collected by the laser to which the point to be coded currently belongs. For example, if the point to be coded currently is an $8^{th}$ point collected by the laser, the search range may include coded points from a $7^{th}$ point to a $2^{nd}$ point, and a size of the search range is 6. Then, previous three points nearest to depth information of the point to be coded currently are selected from the search range. Further, if no point with same depth information exists among the three points, attribute information of the three points is directly inserted into the prediction list. If a point with same depth information exists among the three points, the three points needs to be screened correspondingly. Specifically, a point with same depth information is first found among the three points. If two of the three points have the same depth information, one remaining point with different depth information is first inserted into the prediction list. Then one previous point nearest to a spatial position of the point to be coded currently is selected from the two points with the same depth information. Because only the previous point is selected, it is not required to determine whether points with the same spatial position exist, and the previous point is directly inserted into the prediction list.

(c) When it is determined that the prediction list is not filled, several points are successively selected from coded points collected by other lasers, and attribute information of the selected points is inserted into the prediction list.

Specifically, when the prediction list is not filled, if a coded point collected by a laser different from a laser for collecting the point to be coded currently exists, namely, a coded point exists among points collected by another laser, a corresponding point is selected from several points collected by a laser right above the point to be coded currently, to update the prediction list.

Update is specifically the same as the foregoing step (b).

It should be noted that after attribute information of a previously coded point of the point to be coded currently and attribute information of several points in coded points collected by a laser to which the point to be coded currently belongs are inserted into the prediction list, if the prediction list is not filled, several points need to be further selected from coded points collected by a laser above the point to be coded currently, and the several points are into the prediction list. In this case, if the prediction list is still not filled, search is continually performed on the laser upward, until the prediction list is filled or all lasers right above are searched.

Step (c) in this embodiment is described in detail below in a specific example.

Figure 3:
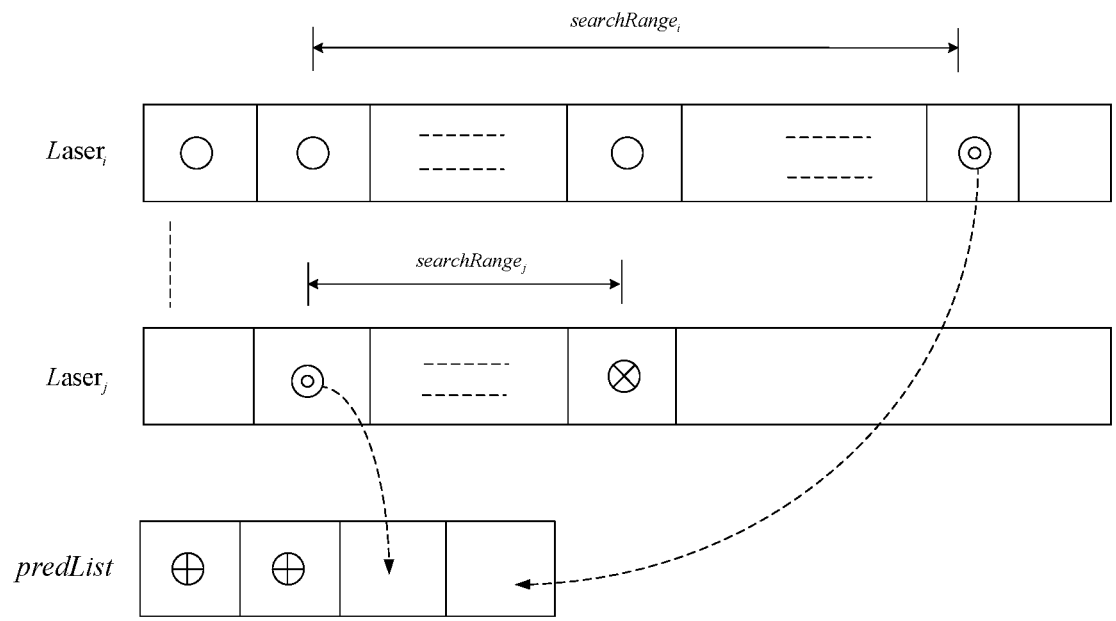
FIG. 3 is a schematic diagram of updating a prediction list by using a coded point collected by a laser above a point to be coded currently, according to an embodiment of the present invention.

FIG. 3 is a schematic diagram of updating a prediction list by using a coded point collected by a laser above a point to be coded currently, according to an embodiment of the present invention. In FIG. 3, ⊗ is attribute information of a point to be coded, ○ is attribute information of the coded point, ⊙ is attribute information to be inserted into the prediction list, and ⊕ is attribute information of a point existing in the prediction list.

First, it is assumed that a laser to which the point to be coded currently belongs is a $j^{th}$ laser. A search range is determined in a coded point collected by a $j-1^{th}$ laser right above the point to be coded currently. For example, if the point to be coded currently is an $8^{th}$ point collected by the $j^{th}$ laser, the search range may include coded points between a $5^{th}$ point and an $11^{th}$ point collected by the $j-1^{th}$ laser, and a size of the search range is 7. Then, previous two points with the depth information and nearest to the point to be coded currently are selected from the search range. Further, if no point with same depth information exists between the two points, attribute information of the two points is directly inserted into the prediction list. If a point with same depth information exists between the two points, the two points need to be screened correspondingly. Specifically, first, points with the same depth information is found from the two points. If the depth information of the two points is the same, one previous point nearest to a spatial position of the point to be coded currently is selected. Because only the previous point is selected, it is not required to determine whether points with the same spatial position exist, and the previous point is directly inserted into the prediction list. Next, if the prediction list is still not filled, search is still performed in a $j-2^{th}$ laser right above the point to be coded currently, until the prediction list is filled or all lasers right above are found.

It should be noted that an attribute information value in the prediction list may be adjusted accordingly as needed.

By far, the adaptive prediction list of the attribute information of the point to be coded currently is obtained.

According to this embodiment, an adaptively updated prediction list of the attribute information of the point cloud is created, and an optimal prediction mode is selected from the list to predict the attribute information of the point cloud. Therefore, a problem of discontinuity of the attribute information of the point cloud caused by discontinuity of an actual scenario is resolved. Accordingly, the predicted residual and a frequency of occurrence of an outlier and a hop, of the attribute information are significantly reduced, and prediction accuracy and coding efficiency of the attribute information are improved.

Step 3: Select a prediction mode from the adaptive prediction list and predict the attribute information of the point cloud, to obtain the predicted residual.

Specifically, a prediction mode with lowest costs may be selected from the prediction list through an existing rate-distortion optimization technology, to predict the attribute information of the current point to be coded currently. Therefore, the predicted residual of the attribute information is obtained.

Step 4: Code the prediction mode and predicted residual, to obtain codestream information. The step specifically includes the following.

(41) A context model is designed for the prediction mode based on the adaptive prediction list.

Specifically, in this embodiment, first, depth information of a point in the adaptive prediction list is obtained.

Then, a difference between depth information of a point and the depth information of the point to be coded currently in the adaptive prediction list is calculated, and a position of a point with a smallest difference in the prediction list is selected as an estimated value of a prediction mode of the point to be coded currently.

Finally, the estimated value is used as an entropy coding context of the prediction mode of the point to be coded currently.

(42) The prediction mode is coded by using the context model.

Specifically, the selected prediction mode is coded by using the context model and an existing entropy coding technology.

(43) The predicted residual is coded to obtain the codestream information.

Specifically, the existing entropy coding technology is used to code the predicted residual of the attribute information, to obtain the codestream information.

In this embodiment, when the attribute information of the point cloud is coded, the entropy coding context is designed for the prediction mode based on the recreated prediction list. Therefore, effectiveness of an entropy coding context model is improved, and coding efficiency is further improved.

According to the present invention, the adaptively updated prediction list of attribute information is created, an optimal prediction mode is selected from the list to predict the attribute information of the point cloud, and the entropy coding context of the prediction mode is further designed based on the prediction list, to code the attribute information of the point cloud. In this method, the correlation between the depth information and attribute information of the point cloud is fully considered, and a problem of discontinuity of the attribute information of the point cloud caused by discontinuity of an actual scenario is resolved. Accordingly, the predicted residual and a frequency of occurrence of an outlier and a hop, of the attribute information are significantly reduced, and prediction accuracy and coding efficiency of the attribute information are improved.

Embodiment 2

Figure 4:
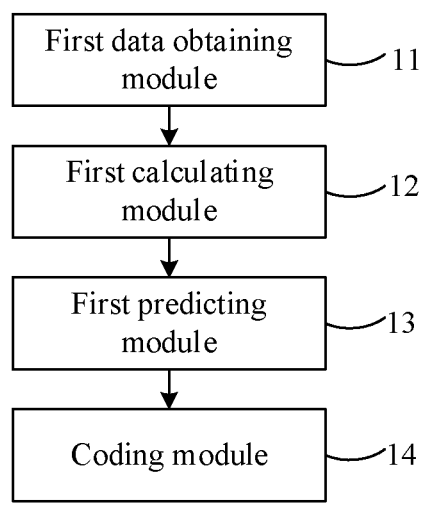
FIG. 4 is a schematic structural diagram of an apparatus for predictively coding attribute information of a point cloud according to an embodiment of the present invention.

Based on the foregoing Embodiment 1, this embodiment provides an apparatus for predictively coding the attribute information of the point cloud. FIG. 4 is a schematic structural diagram of an apparatus for predictively coding attribute information of a point cloud according to an embodiment of the present invention. The apparatus includes:
- a first data obtaining module 11, configured to obtain original point cloud data;
- a first calculating module 12, configured to create an adaptive prediction list of the attribute information of the point cloud;
- a first predicting module 13, configured to select a prediction mode from the adaptive prediction list and predict the attribute information of the point cloud, to obtain the predicted residual; and
- a coding module 14, configured to code the prediction mode and predicted residual, to obtain codestream information.

The apparatus provided in this embodiment can implement the coding method provided in the foregoing Embodiment 1. Details are not described herein again.

Embodiment 3

Figure 5:
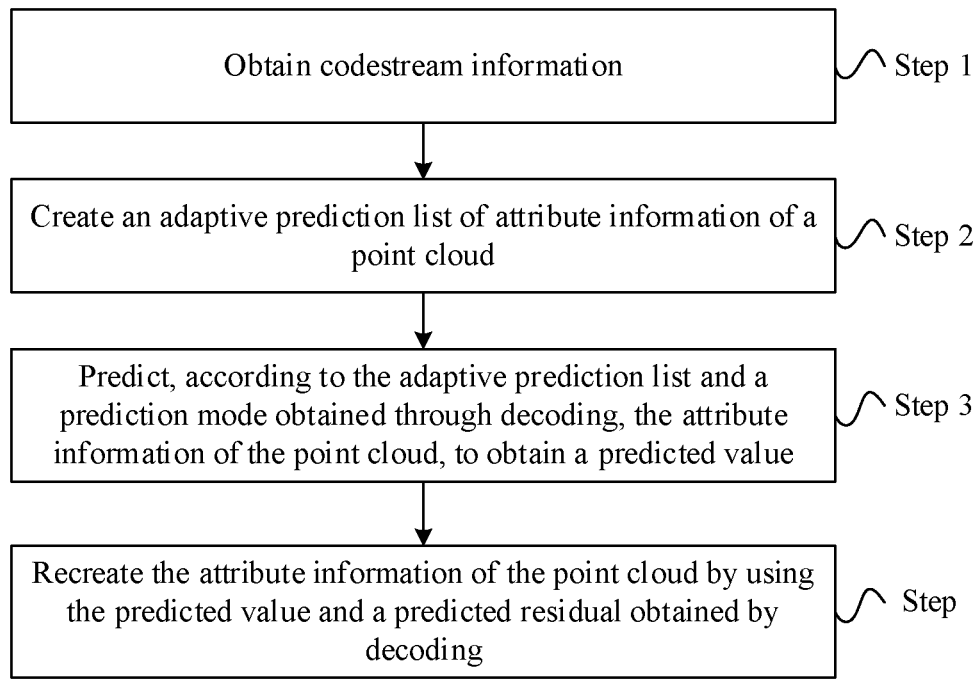
FIG. 5 is a schematic flowchart of a method for predictively decoding attribute information of a point cloud according to an embodiment of the present invention.

This embodiment provides a method for predictively decoding attribute information of a point cloud. FIG. 5 is a schematic flowchart of a method for predictively decoding attribute information of a point cloud according to an embodiment of the present invention. The method includes the following steps.

Step 1: Obtain codestream information.

Step 2: Create an adaptive prediction list of the attribute information of the point cloud.

In this embodiment, for creation of the adaptive prediction list of the attribute information of the point cloud, reference may be made to the method for the coding end in the Embodiment 1. Details are not described herein again.

Step 3: Predict, based on the adaptive prediction list and a prediction mode obtained through decoding, the attribute information of the point cloud, to obtain a predicted value.

For the prediction mode, the coding end uses the adaptive prediction list of the attribute information of the point cloud to design an entropy coding context model for the prediction mode. Therefore, at a decoding end, it is also required to design a corresponding entropy decoding context model for the prediction mode by using the adaptive prediction list of the attribute information of the point cloud, thereby obtaining the prediction mode through decoding.

A corresponding value is selected, based on the prediction mode, from the adaptive prediction list as the predicted value of the attribute information of the point cloud.

Step 4: Recreate the attribute information of the point cloud by using the predicted value and a predicted residual obtained by decoding.

For the predicted residual, because a conventional entropy coding method is used at the coding end, a corresponding entropy decoding method may be directly used at the decoding end, to obtain the predicted residual of the attribute information of the point cloud.

The reconstructed attribute information of the point cloud may be obtained by adding the predicted value obtained in step 3 to the predicted residual.

Embodiment 4

Figure 6:
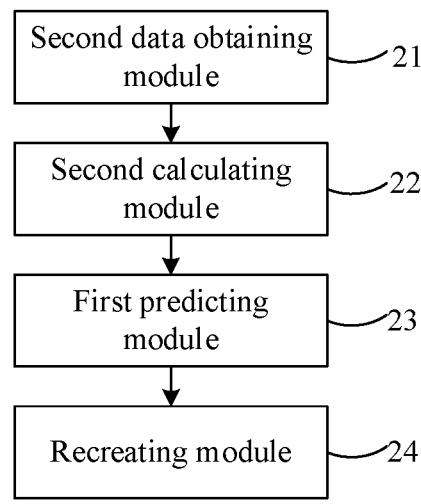
FIG. 6 is a schematic structural diagram of an apparatus for predictively decoding attribute information of a point cloud according to an embodiment of the present invention.

Based on the foregoing Embodiment 3, this embodiment provides an apparatus for predictively decoding the attribute information of the point cloud. FIG. 6 is a schematic structural diagram of an apparatus for predictively decoding attribute information of a point cloud according to an embodiment of the present invention. The apparatus includes:
- a second obtaining module 21, configured to obtain codestream information;
- a second calculating module 22, configured to create an adaptive prediction list of the attribute information of the point cloud;
- a second predicting module 23, configured to predict, based on the adaptive prediction list and a prediction mode obtained through decoding, the attribute information of the point cloud, to obtain a predicted value; and a recreating module 24, configured to recreate the attribute information of the point cloud by using the predicted value and a predicted residual obtained by decoding.

The apparatus provided in this embodiment can implement the decoding method provided in the foregoing Embodiment 3. Details are not described herein again.

The foregoing are further detailed descriptions of the present invention with reference to specific preferred implementations, and it cannot be considered that the implementations of the present invention are only limited to these descriptions. A person of ordinary skill in the art to which the present invention belongs may make simple deductions or replacements without departing from the concept of the present invention, all of which shall be considered as falling within the protection scope of the present invention.

What is claimed is:

1. A method for predictively coding attribute information of a point cloud, wherein the method comprises:
   obtaining original point cloud data;
   creating an adaptive prediction list of the attribute information of the point cloud;
   wherein creating the adaptive prediction list of the attribute information of the point cloud comprises:
   creating and initializing a prediction list; and
   selecting a plurality of points from a plurality of coded points based on a rule, and updating the prediction list based on attribute information of the selected plurality of points, to obtain an adaptive prediction list of attribute information of a point to be currently coded, wherein selecting the plurality of points from the plurality of coded points based on the rule, and updating the prediction list based on the attribute information of the selected plurality of points, comprises:
      inserting attribute information of a previously coded point of the point to be currently coded into a first position of the prediction list;
      selecting the plurality of points from the plurality of coded points that are collected by a laser to which the point to be currently coded belongs, and inserting the attribute information of the selected plurality of points into the prediction list; and
      when it is determined that the prediction list is not filled, successively selecting another plurality of points from coded points collected by other lasers, and inserting the attribute information of the selected another plurality of points into the prediction list;
   selecting a prediction mode from the adaptive prediction list and predicting the attribute information of the point cloud, to obtain a predicted residual; and
   coding the prediction mode and the predicted residual, to obtain codestream information.

2. The method for predictively coding attribute information of the point cloud according to claim 1, wherein selecting the plurality of points from the plurality of coded points collected by the laser to which the point to be currently coded belongs and inserting the attribute information of the selected plurality of points into the prediction list comprises:
   determining a search range in the coded points collected by the laser to which the point to be currently coded belongs;
   selecting m points in the search range based on first information;
   when it is determined that one or more points with same first information exists among the m points, screening the m points based on second information of the one or more points, and inserting attribute information of a selected point of the one or more points into the prediction list; and
   when it is determined that no point with same first information exists among the m points, inserting attribute information of the m points into the prediction list.

3. The method for predictively coding attribute information of the point cloud according to claim 2, wherein screening the m points based on the second information of the one or more points, and inserting the attribute information of the selected point of the one or more points into the prediction list comprises:
   finding n points with the same first information among the m points;
   inserting attribute information of m-n points with different first information in the m points into the prediction list;
   selecting, from the n points, previous t points with the second information and nearest to the point to be currently coded; and
   when it is determined that a point with same second information exists among the t points, screening the t points based on third information of the point, and inserting attribute information of a selected point into the prediction list; and
   when it is determined that no point with same second information exists among the t points, inserting attribute information of the t points into the prediction list.

4. The method for predictively coding attribute information of the point cloud according to claim 3, wherein screening the t points based on the third information of the point, and inserting the attribute information of the selected point into the prediction list comprises:
   finding all k points with the same second information among the t points;
   inserting attribute information of t-k points with different second information in the t points into the prediction list; and
   selecting, from the k points, a point with third information and nearest to the point to be currently coded, and inserting attribute information of the point into the prediction list.

5. The method for predictively coding attribute information of the point cloud according to claim 4, wherein the first information is depth information or a spatial position of a point;
   the second information is the depth information or spatial position of the point, wherein when the first information is the depth information, the second information is the spatial position; and when the first information is the spatial position, the second information is the depth information; and
   the third information is azimuth information of the point.

6. The method for predictively coding attribute information of the point cloud according to claim 1, wherein coding the prediction mode and the predicted residual, to obtain the codestream information comprises:
   designing a context model for the prediction mode based on the adaptive prediction list;
   coding the prediction mode by using the context model; and
   coding the predicted residual, to obtain the codestream information.

7. An apparatus for predictively coding attribute information of a point cloud, wherein the apparatus comprises:

at least one processor, configured to:
obtain original point cloud data;
create an adaptive prediction list of the attribute information of the point cloud, wherein creating the adaptive prediction list of the attribute information of the point cloud comprises:
creating and initializing a prediction list; and
selecting a plurality of points from a plurality of coded points based on a rule, and updating the prediction list based on attribute information of the selected plurality of points, to obtain an adaptive prediction list of attribute information of a point to be currently coded, wherein selecting the plurality of points from the plurality of coded points based on the rule, and updating the prediction list based on the attribute information of the selected plurality of points, comprises:
inserting attribute information of a previously coded point of the point to be currently coded into a first position of the prediction list;
selecting the plurality of points from the plurality of coded points that are collected by a laser to which the point to be currently coded belongs, and inserting the attribute information of the selected plurality of points into the prediction list; and
when it is determined that the prediction list is not filled, successively selecting another plurality of points from coded points collected by other lasers, and inserting the attribute information of the selected another plurality of points into the prediction list;
select a prediction mode from the adaptive prediction list and predict the attribute information of the point cloud, to obtain a predicted residual; and
code the prediction mode and the predicted residual, to obtain codestream information.

8. The apparatus according to claim 7, wherein selecting the plurality of points from the plurality of coded points collected by the laser to which the point to be currently coded belongs and inserting the attribute information of the selected plurality of points into the prediction list comprises:
determining a search range in the coded points collected by the laser to which the point to be currently coded belongs;
selecting m points in the search range based on first information;
when it is determined that one or more points with same first information exists among the m points, screening the m points based on second information of the one or more points, and inserting attribute information of a selected point of the one or more points into the prediction list; and
when it is determined that no point with same first information exists among the m points, inserting attribute information of the m points into the prediction list.

9. The apparatus according to claim 8, wherein screening the m points based on the second information of the one or more points, and inserting the attribute information of the selected point of the one or more points into the prediction list comprises:
finding n points with the same first information among the m points;
inserting attribute information of m-n points with different first information in the m points into the prediction list;
selecting, from the n points, previous t points with the second information and nearest to the point to be currently coded; and when it is determined that a point with same second information exists among the t points, screening the t points based on third information of the point, and inserting attribute information of a selected point into the prediction list; and
when it is determined that no point with same second information exists among the t points, inserting attribute information of the t points into the prediction list.

10. The apparatus according to claim 9, wherein screening the t points based on the third information of the point, and inserting the attribute information of the selected point into the prediction list comprises:
finding all k points with the same second information among the t points;
inserting attribute information of t-k points with different second information in the t points into the prediction list; and
selecting, from the k points, a point with third information and nearest to the point to be currently coded, and inserting attribute information of the point into the prediction list.

11. The apparatus according to claim 10, wherein the first information is depth information of a point, the second information is spatial position of the point, and the third information is azimuth information of the point.

12. The apparatus according to claim 10, wherein the first information is a spatial position of a point, the second information is depth information of the point, and the third information is azimuth information of the point.

13. The apparatus according to claim 8, wherein coding the prediction mode and the predicted residual, to obtain the codestream information comprises:
designing a context model for the prediction mode based on the adaptive prediction list;
coding the prediction mode by using the context model; and
coding the predicted residual, to obtain the codestream information.

14. A method for predictively decoding attribute information of a point cloud, wherein the method comprises:
obtaining codestream information;
creating an adaptive prediction list of the attribute information of the point cloud, wherein creating the adaptive prediction list of the attribute information of the point cloud comprises:
creating and initializing a prediction list; and
selecting a plurality of points from a plurality of coded points based on a rule, and updating the prediction list based on attribute information of the selected plurality of points, to obtain an adaptive prediction list of attribute information of a point to be currently coded, wherein selecting the plurality of points from the plurality of coded points based on the rule, and updating the prediction list based on the attribute information of the selected plurality of points, comprises:
inserting attribute information of a previously coded point of the point to be currently coded into a first position of the prediction list;
selecting the plurality of points from the plurality of coded points that are collected by a laser to which the point to be currently coded belongs, and inserting the attribute information of the selected plurality of points into the prediction list; and
when it is determined that the prediction list is not filled, successively selecting another plurality of points from coded points collected by other lasers, and inserting the attribute information of the selected another plurality of points into the prediction list;

predicting, based on the adaptive prediction list and a prediction mode obtained through decoding, the attribute information of the point cloud, to obtain a predicted value; and recreating the attribute information of the point cloud by using the predicted value and a predicted residual obtained by decoding.

15. The method according to claim 14, wherein recreating the attribute information of the point cloud by using the predicted value and the predicted residual obtained by decoding comprises adding the predicted value to the predicted residual obtained by decoding.

16. The method according to claim 14, wherein selecting the plurality of points from the plurality of coded points collected by the laser to which the point to be currently coded belongs and inserting the attribute information of the selected plurality of points into the prediction list comprises:

determining a search range in the coded points collected by the laser to which the point to be currently coded belongs;

selecting m points in the search range based on first information;

when it is determined that one or more points with same first information exists among the m points, screening the m points based on second information of the one or more points, and inserting attribute information of a selected point of the one or more points into the prediction list; and when it is determined that no point with same first information exists among the m points, inserting attribute information of the m points into the prediction list.

17. An apparatus for predictively decoding attribute information of a point cloud, wherein the apparatus comprises:

a processor, configured to:

obtain codestream information;

create an adaptive prediction list of the attribute information of the point cloud, wherein creating the adaptive prediction list of the attribute information of the point cloud comprises:

creating and initializing a prediction list; and selecting a plurality of points from a plurality of coded points based on a rule, and updating the prediction list based on attribute information of the selected plurality of points, to obtain an adaptive prediction list of attribute information of a point to be currently coded, wherein selecting the plurality of points from the plurality of coded points based on the rule, and updating the prediction list based on the attribute information of the selected plurality of points, comprises:

inserting attribute information of a previously coded point of the point to be currently coded into a first position of the prediction list;

selecting the plurality of points from the plurality of coded points that are collected by a laser to which the point to be currently coded belongs, and inserting the attribute information of the selected plurality of points into the prediction list; and when it is determined that the prediction list is not filled, successively selecting another plurality of points from coded points collected by other lasers, and inserting the attribute information of the selected another plurality of points into the prediction list;

predict, based on the adaptive prediction list and a prediction mode obtained through decoding, the attribute information of the point cloud, to obtain a predicted value; and recreate the attribute information of the point cloud by using the predicted value and a predicted residual obtained by decoding.

18. The apparatus according to claim 17, wherein recreating the attribute information of the point cloud by using the predicted value and the predicted residual obtained by decoding comprises adding the predicted value obtained in to the predicted residual obtained by decoding.

19. The apparatus according to claim 17, wherein selecting the plurality of points from the plurality of coded points collected by the laser to which the point to be currently coded belongs and inserting the attribute information of the selected plurality of points into the prediction list comprises:

determining a search range in the coded points collected by the laser to which the point to be currently coded belongs;

selecting m points in the search range based on first information;

when it is determined that one or more points with same first information exists among the m points, screening the m points based on second information of the one or more points, and inserting attribute information of a selected point of the one or more points into the prediction list; and when it is determined that no point with same first information exists among the m points, inserting attribute information of the m points into the prediction list.

* * * * *